United States Patent
Ben-Shachar et al.

(10) Patent No.: US 10,028,077 B2
(45) Date of Patent: Jul. 17, 2018

(54) AVOIDANCE OF COLLISIONS AND CONNECTION LOSS IN NETWORK DEVICE SERVING MULTIPLE NETWORKS

(71) Applicant: Texas Instruments Incorporated, Dallas, TX (US)

(72) Inventors: Matan Ben-Shachar, Kibbutz Givat Haim Ihud (IL); Omri Eshel, Kibbutz Harel (IL); Yuval Jakira, Tel Aviv (IL); Liran Brecher, Kfar Saba (IL); Dotan Ziv, Tel Aviv (IL); Chen Loewy, Hertzliya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

(21) Appl. No.: 15/066,497

(22) Filed: Mar. 10, 2016

(65) Prior Publication Data
US 2017/0265101 A1 Sep. 14, 2017

(51) Int. Cl.
*H04W 28/04* (2009.01)
*H04W 4/00* (2018.01)
*H04W 72/04* (2009.01)
*H04W 74/08* (2009.01)
*H04W 4/80* (2018.01)
*H04W 84/18* (2009.01)

(52) U.S. Cl.
CPC ............ *H04W 4/008* (2013.01); *H04W 4/80* (2018.02); *H04W 74/085* (2013.01); *H04W 72/0446* (2013.01); *H04W 84/18* (2013.01)

(58) Field of Classification Search
CPC . H04W 28/044; H04W 4/008; H04W 28/046; H04W 72/0446
See application file for complete search history.

(56) References Cited

U.S. PATENT DOCUMENTS

2007/0030824 A1* 2/2007 Ribaudo ............... G01S 5/0018
                                                          370/328
2011/0255528 A1* 10/2011 Zakrzewski ........ H04W 56/009
                                                          370/350

OTHER PUBLICATIONS

"Core System Package [Low Energy Controller volume]", Bluetooth System, Specification vol. 6, Version 4.1, Dec. 3, 2013, pp. 83-85.
"Bluetooth", Wikipedia, available at https://en.wikipedia.org/wiki/Bluetooth on Feb. 24, 2016, pp. 1-14.
"CC256x Dual-Mode Bluetooth Controller, CC2560A NRND: CC2564 NRND", Texas Instruments Inc., CC2560A, CC2560B, CC2564, CC2564B, SWRS121E, Jul. 2012, Revised Jan. 2016, pp. 1-98.

* cited by examiner

*Primary Examiner* — Ronald B Abelson
(74) *Attorney, Agent, or Firm* — Gregory J. Albin; Charles A. Brill; Frank D. Cimino (57) ABSTRACT

A network device serving two or more networks using periodic times slots for transmission events is configured to determine that one of the periodic time slots on one of the networks has or soon will collide with one of the periodic time slots on the other network by processing time stamps for events on each network. Either of the periodic time slots may be occasionally shifted by a time shift amount to avoid a collision between the periodic time slots on each network. Shifting the periodic time slots may be performed by transmitting a Bluetooth connection parameter update packet.

14 Claims, 10 Drawing Sheets

AVOIDANCE OF COLLISIONS AND CONNECTION LOSS IN NETWORK DEVICE SERVING MULTIPLE NETWORKS

FIELD OF THE INVENTION

This disclosure relates communication between Bluetooth devices on two or more piconets, and in particular to minimizing event collisions due to clock drift.

BACKGROUND OF THE INVENTION

Bluetooth is a wireless technology standard for exchanging data over short distances using short-wavelength UHF radio waves in the ISM band from 2.4 to 2.485 GHz from fixed and mobile devices, and may be used for building personal area networks (PANs). Bluetooth is managed by the Bluetooth Special Interest Group (SIG), which has a large number of member companies in the areas of telecommunication, computing, networking, and consumer electronics. The IEEE standardized Bluetooth as IEEE 802.15.1, but no longer maintains the standard. The Bluetooth SIG oversees development of the specification, manages the qualification program, and protects the trademarks.

A piconet is a network which links a wireless user group of devices using Bluetooth technology protocols. A piconet includes two or more devices occupying the same physical channel (synchronized to a common clock and hopping sequence). It allows one master device to interconnect with up to seven active slave devices. Up to 255 further slave devices can be inactive, or parked, which the master device can bring into active status at any time, but an active station must go into parked first.

Some examples of piconets include a cell phone connected to a computer, a laptop and a Bluetooth-enabled digital camera, or several PDAs that are connected to each other.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The general operation of Bluetooth devices is well known, see for example, "Bluetooth", from Wikipedia, last modified 24 Feb. 2016, which is incorporated by reference herein. The Bluetooth SIG announced formal adoption of the Bluetooth v4.1 specification on 4 Dec. 2013. The update incorporated Bluetooth Core Specification Addenda (CSA 1, 2, 3 & 4) and added new features that improve consumer usability. Bluetooth Specification Version 4.1 is incorporated by reference herein.

A group of devices may be connected via Bluetooth technology in an ad hoc fashion. A piconet starts with two connected devices, and may grow to eight connected devices. Bluetooth communication always designates one of the Bluetooth devices as a main controlling unit or master unit. Other devices that follow the master unit are slave units. This allows the Bluetooth system to be non-contention based (no collisions). This means that after a Bluetooth device has been added to the piconet, each device is assigned a specific time period as a set of periodic time slots in which to transmit. The set of periodic time slots assigned to one device do not collide or overlap with sets of periodic time slots assigned to other units operating within the same piconet.

However, when one Bluetooth or BLE (Bluetooth Low Energy) device serves two piconets simultaneously, the drift between the piconets' reference clocks may eventually cause repetitive collisions between the slots allocated to each connection. The result will be repetitive packet loss in one of the connections, typically causing connection loss. A solution is to set the connection periods to be mathematically strange to each other. This poses two new problems—first, this is not always possible from an application point of view, and second, instead of repetitive collisions, this method may cause periodic collisions that degrade network performance, such as: latency, throughput, total air capacity etc.

A method will be disclosed herein in which the drift between the reference clocks of the two piconets is studied. These estimated drift values may be used together with timestamps of events from the two connections to predict when such collisions may occur. A "connection update protocol" defined within the Bluetooth v4.1 specification may be used to shift the assigned time slots of one of the connections in time, thus avoiding the collisions altogether.

A brief description of Bluetooth operation is included herein. The Bluetooth specifications, such as Bluetooth V4.1 or later versions, may be consulted for more details. Bluetooth wireless technology is a short-range communications system intended to replace the cable(s) connecting portable and/or fixed electronic devices. The key features of Bluetooth wireless technology are robustness, low power consumption, and low cost. Many features of the core specification are optional, allowing product differentiation.

There are two forms of Bluetooth wireless technology systems: Basic Rate (BR) and Low Energy (LE). Both systems include device discovery, connection establishment and connection mechanisms. The Basic Rate system includes optional Enhanced Data Rate (EDR) Alternate Media Access Control (MAC) and Physical (PHY) layer extensions. The Basic Rate system offers synchronous and asynchronous connections with data rates of 721.2 kbps for Basic Rate, 2.1 Mbps for Enhanced Data Rate. The LE system includes features designed to enable products that require lower current consumption, lower complexity and lower cost than BR/EDR. The LE system is also designed for use cases and applications with lower data rates and has lower duty cycles. Depending on the use case or application, one system including any optional parts may be more optimal than the other.

Devices implementing both systems can communicate with other devices implementing both systems as well as devices implementing either system. Some profiles and use cases may be supported by only one of the systems. Therefore, devices implementing both systems have the ability to support the most use cases.

A Bluetooth core system includes a "host" and one or more "slave controllers". A host is a logical entity defined as all of the layers below the non-core profiles and above the Host Controller Interface (HCI). A controller is a logical entity defined as all of the layers below HCI. An implementation of the host and Controller may contain the respective parts of the HCI. Two types of controllers are defined in the V4.1 version of the Core Specification: "Primary Controllers" and "Secondary Controllers."

An implementation of the Bluetooth Core has only one primary controller which may be one of the following configurations: a BR/EDR Controller including the Radio, Baseband, Link Manager and optionally HCI; an LE Controller including the LE PHY, Link Layer and optionally HCI; or a combined BR/EDR Controller portion and LE controller portion into a single Controller. This configuration has only one Bluetooth device address shared by the combination in the combined controller.

Like the BR/EDR radio, the LE radio operates in the unlicensed 2.4 GHz ISM band. The LE system employs a frequency hopping transceiver to combat interference and fading and provides many FHSS (frequency hopping spread spectrum) carriers. LE radio operation uses a shaped, binary frequency modulation to minimize transceiver complexity.

The symbol rate for LE is 1 Mega-symbol per second (Ms/s) supporting a bit rate of 1 Megabit per second (Mb/s).

LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between LE devices in packets that are positioned in these events. There are two types of events: "Advertising" and "Connection" events.

Devices that transmit advertising packets on the advertising PHY channels are referred to as advertisers. Devices that receive advertising packets on the advertising channels without the intention to connect to the advertising device are referred to as scanners. Transmissions on the advertising PHY channels occur in advertising events. At the start of each advertising event, the advertiser sends an advertising packet corresponding to the advertising event type. Depending on the type of advertising packet, the scanner may make a request or a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

LE devices may fulfill the entire communication in the case of unidirectional or broadcast communication between two or more devices using advertising events. They may also use advertising events to establish pair-wise bi-directional communication between two or more devices using data channels.

Devices that need to form a connection to another device listen for connectable advertising packets. Such devices are referred to as initiators. If the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in what is referred to as a piconet and the advertising device becomes the slave device. Connection events are used to send data packets between the master and slave devices. In connection events, channel hopping occurs at the start of each connection event. Within a connection event, the master and slave alternate sending data packets using the same data PHY channel. The master initiates the beginning of each connection event and can end each connection event at any time.

Devices in a piconet use a specific frequency hopping pattern, which is algorithmically determined by a field contained in the connection request sent by an initiating device. The initiating device provides the synchronization reference known as a hop interval. The hopping pattern used in LE is a pseudo-random ordering of the 37 frequencies in the ISM band. The hopping pattern can be adapted to exclude a portion of the frequencies that are used by interfering devices. The adaptive hopping technique improves Bluetooth co-existence with static (non-hopping) ISM (industrial, scientific, medical) systems when these are co-located and have access to information about the local radio environment, or detected by other means.

Above the physical channel there are concepts of links, channels and associated control protocols. The hierarchy is physical channel, physical link, logical transport, logical link and L2CAP (logical link control and adaptation protocol) channel.

Within a physical channel, a physical link is formed between a master and each slave. Direct physical links between slaves in a piconet are not supported. Slaves are permitted to have physical links to more than one master at a time. A device is permitted to be master and slave at the same time. Role changes between a master and slave device are not supported at this time.

The physical link is used as a transport for one or more logical links that support asynchronous traffic. Traffic on logical links is multiplexed onto the physical link assigned by a scheduling function in the resource manager.

A control protocol for the link and physical layers is carried over logical links in addition to user data. This is the link layer protocol (LL). Devices that are active in a piconet have a default LE asynchronous connection logical transport (LE ACL) that is used to transport the LL protocol signaling. The default LE ACL is the one that is created whenever a device joins a piconet. The Link Layer function uses the LL protocol to control the operation of devices in the piconet and provide services to manage the lower architectural layers (PHY and LL).

Just as in BR/EDR, above the link layer the L2CAP layer provides a channel based abstraction to applications and services. It carries out fragmentation and de-fragmentation of application data and multiplexing and de-multiplexing of multiple channels over a shared logical link. L2CAP has a protocol control channel that is carried over the primary ACL logical transport.

In addition to L2CAP, LE provides two additional protocol layers that reside on top of L2CAP. The Security Manager protocol (SMP) uses a fixed L2CAP channel to implement the security functions between devices. The other is the Attribute protocol (ATT) that provides a method to communicate small amounts of data over a fixed L2CAP channel. The Attribute protocol is also used by devices to determine the services and capabilities of other devices. The Attribute protocol may also be used over BR/EDR.

Figure 1:
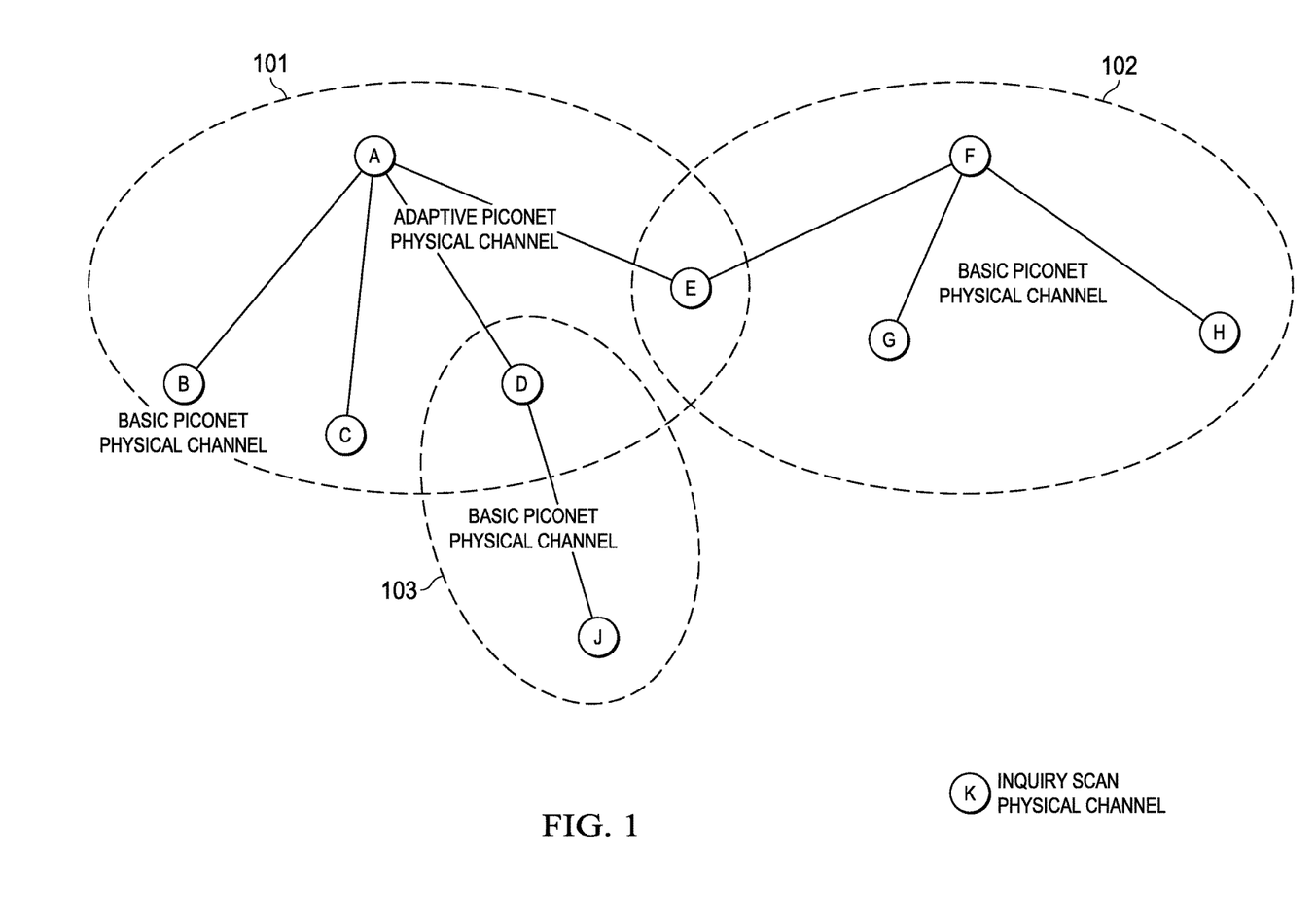
FIG. 1 is an illustration of three piconets each including multiple Bluetooth devices.

FIG. 1 is an illustration a topology of three piconets 101, 102, 103 each including multiple Bluetooth devices. Device A is a master in piconet 103, also referred to as piconet A, with devices B, C, D and E as slaves. Two other piconets are shown: piconet 102 with device F as master (known as piconet F) and devices E, G and H as slaves, and piconet 103 with device D as master (known as piconet D) and device J as slave.

In piconet A there are two physical channels. Devices B and C are using the basic piconet physical channel as they do not support adaptive frequency hopping. Devices D and E are capable of supporting adaptive frequency hopping, and are using the adapted piconet physical channel. Device A is capable of adaptive frequency hopping, and operates in a TDM basis on both physical channels according to which slave is being addressed.

Piconet D and piconet F are both using only a basic piconet physical channel. In the case of piconet D this is because device J does not support the adaptive hopping mode. Although device D supports adaptive hopping it cannot use it in this piconet. In piconet F device F does not support adaptive hopping, and therefore it cannot be used in this piconet.

In piconet 101, Bluetooth device A is the host, while Bluetooth devices B, C, D, E and J are all controllers that are coupled to device A. In piconet 102, Bluetooth device F is the host, while devices E, G and H are coupled to device F.

Device K is shown in the same locality as the other devices. It is not currently a member of a piconet, but has services that it offers to other Bluetooth devices. It is currently listening on its inquiry scan physical channel, awaiting an inquiry request from another device.

In this example, device E is serving piconet 101 and also piconet 102. Similarly, device D is serving piconet 101 and piconet 103.

In many use-cases, one BT/BLE device serves simultaneously in two piconets, usually with two different master clocks, as illustrated by device E and device D in FIG. 1. In such 'multi-piconet' cases, the 'dual mode' device sharing the two piconets holds two time-base, one for each piconet. In this case, the 'event slots' allocated to each of this device's connections may overlap with one another causing what is commonly known as a 'collision'.

Even in situations where no such collisions are currently present, the frequency difference, which may be expressed as parts per million (PPMs), between the two piconets' master clocks may cause a drift between the two time-bases, eventually causing such collisions to occur. The result will be consecutive or periodic packet loss in the connections. In the best case, there may be degradation in performance. For example, when a voice signal is being transmitted on an enhanced synchronous connection-oriented (eSCO) link, reserved slot violations may occur. In a worst case, connection loss may result.

FIGS. 2A-2D are plots illustrating different collision patterns for events on two piconets, such as piconets 101, 102, referring back to FIG. 1. A Bluetooth/BLE connection has pre-set synchronous 'event slots' in time in which the transactions are performed. The time between such events (the 'connection period' known as 'interval') is pre-set for a certain connection, and may span between 6 and 3200 units of 1.25 mSec. Every such connection is part of a piconet—a bundle of connections with the same 'master' device, as illustrated in FIG. 1. Since the devices in each piconet have different reference clocks which may have slightly different frequencies (PPMs), every device has its own 'time-base'. In order to avoid loss of synchronization, all devices in a piconet learn and 'lock onto' the time-base of the piconet master.

Figure 2A:
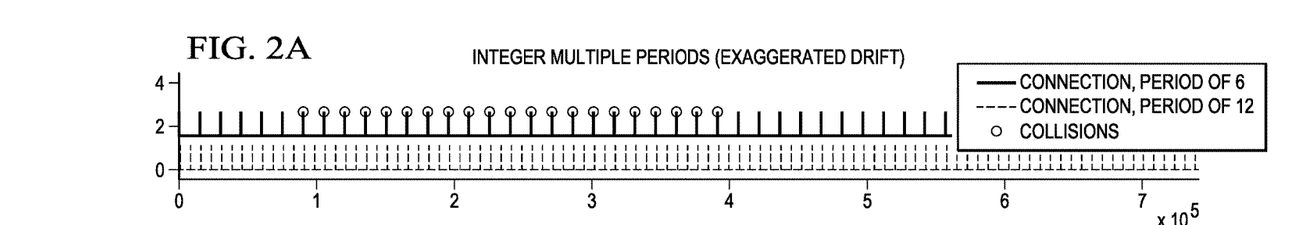
FIGS. 2A-2D are plots illustrating different collision patterns for events on two piconets.
Figure 2B:
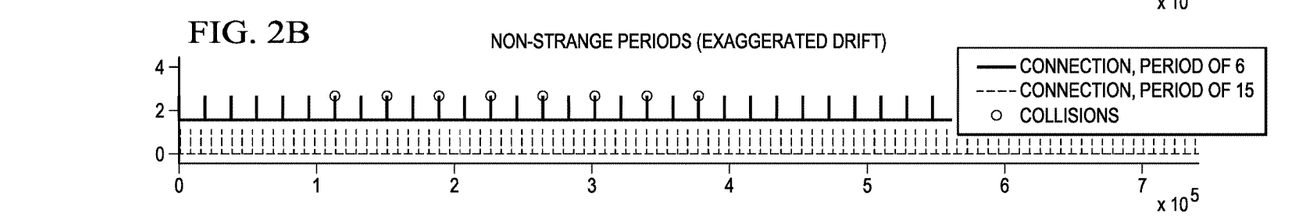
Figure 2C:
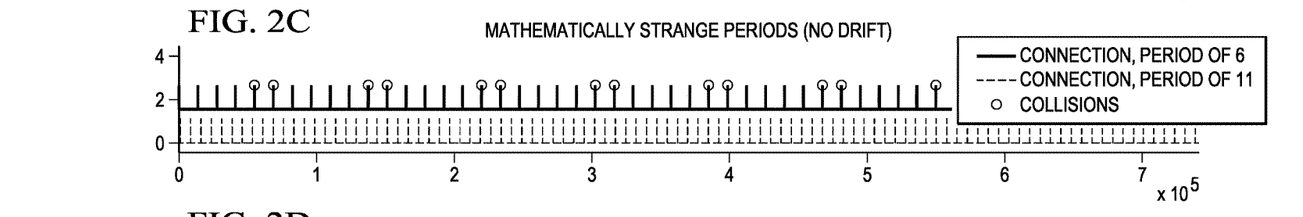
Figure 2D:
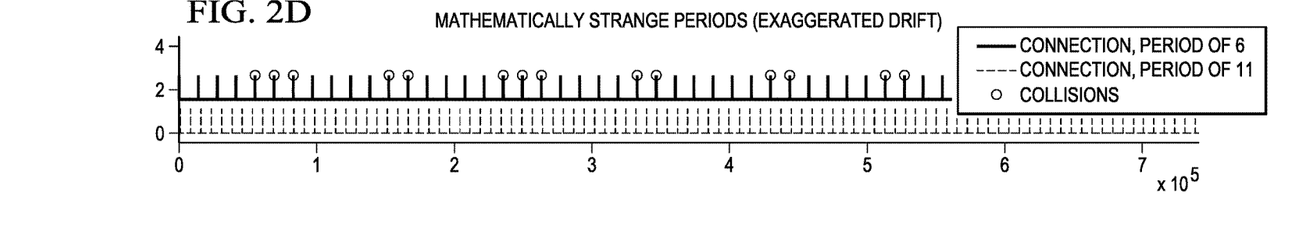

An exaggerated drift (8000 PPM) was introduced on the plots of FIGS. 2A, 2B and 2D in order to present the concept more clearly. FIG. 2A illustrates an example in which one piconet has a period of six, while the second piconet has a period of twelve, which is an integer multiple of the first period. Note that a large number of collisions may occur sequentially once an overlap begins. FIG. 2B illustrates an example in which the periods are non-strange: one piconet has a period of six, while the other has a period of fifteen. Note that a significant number of collisions may occur, although perhaps not in a sequential manner. FIG. 2C illustrates an example in which the periods are "mathematically strange" with no drift, in which one piconet has a period of six while the other piconet has a period of eleven. FIG. 2D illustrates the same mathematically strange example with drift. The mathematically strange intervals are shown both with and without drift, in order to emphasize the fact that periodic collisions are always present in this situation, no matter the phase. As used herein, mathematically strange numbers are defined as follows: A and B integers are 'strange' if LCM(A,B)=A*B, or alternatively, if GCD(A,B)=1, where "LCM" is the least common multiple and "GCD" is the greatest common divisor. In either case, collisions will still occur.

One way to address the problem of collisions is to set the second connection's period to be mathematically strange, or at least not an integer multiple of the existing connection's period. This solution has two major drawbacks: forced connection period restrictions, and periodic collisions.

In the first drawback, some applications/use-cases do not allow a random choice of forced connection periods, but rather specify the required period. If a device is forced into having connections with integer multiple periods connection loss will take place eventually, as previously described with regard to FIG. 2A.

A partial solution to these cases may be 'master chasing slave' which is applicable only in the case in which the dual-piconet device is master of one of the piconets. In this case, the device may introduce a small artificial drift on the time-base it is master of. This artificial drift may be set to reduce the overall 'piconet vs. piconet' time-base drift, which in turn delays the collisions and the following connection loss.

In the second drawback, periodic collisions will still be present even if periods are not integer multiples, as illustrated by FIGS. 2B-2D. If periods are not integer multiples nor mathematically strange the drift will eventually cause a long period of time in which periodic collisions will take place. The connections might not be lost, but performance will be heavily degraded. If periods are mathematically strange (also not integer multiples), periodic collisions will be present as long as the two connections last. Again, connections might not be lost, but performance may be heavily degraded Thus, without a better way to overcome drift induced collisions, a device serving two piconets may suffer either periodic connection loss, or degraded performance, throughput, and/or latency, which may require buffering and may cause poor overall air utilization.

Figure 3A:
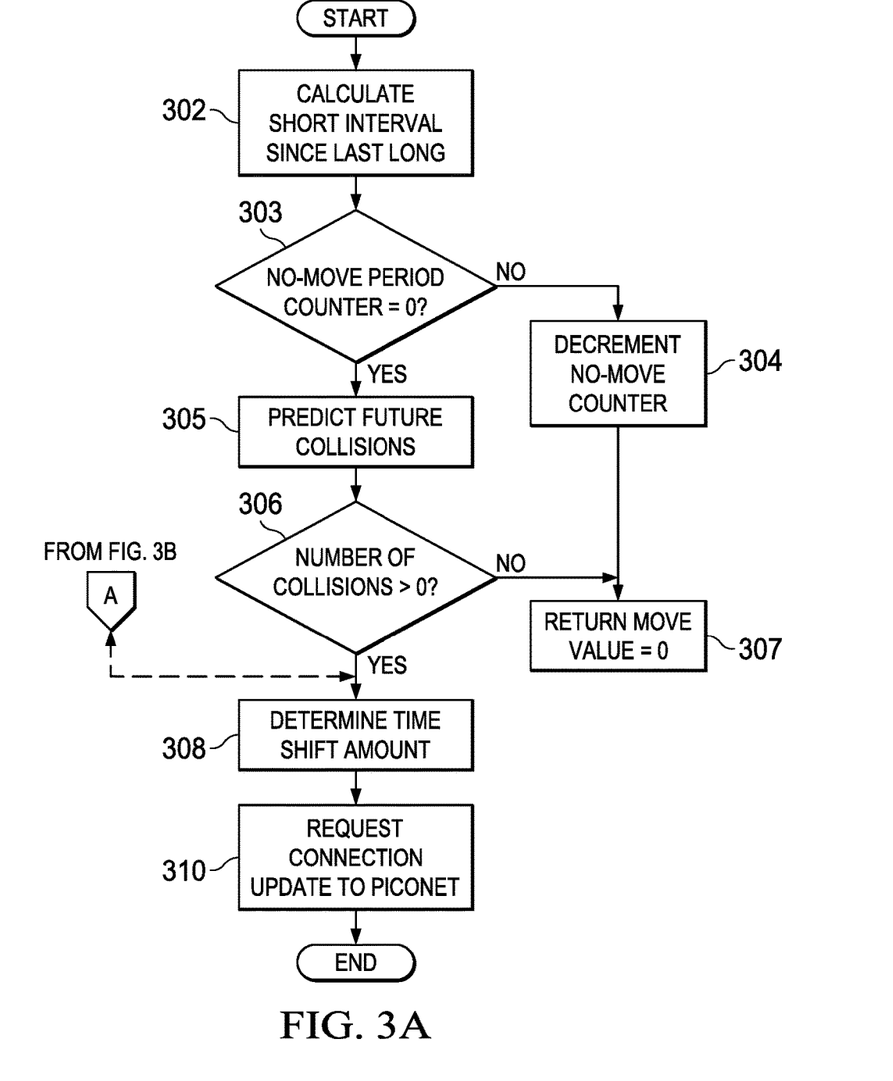
FIGS. 3A-3B are flow charts illustrating a method for avoidance of connection loss by a Bluetooth device serving two piconets.
Figure 3B:
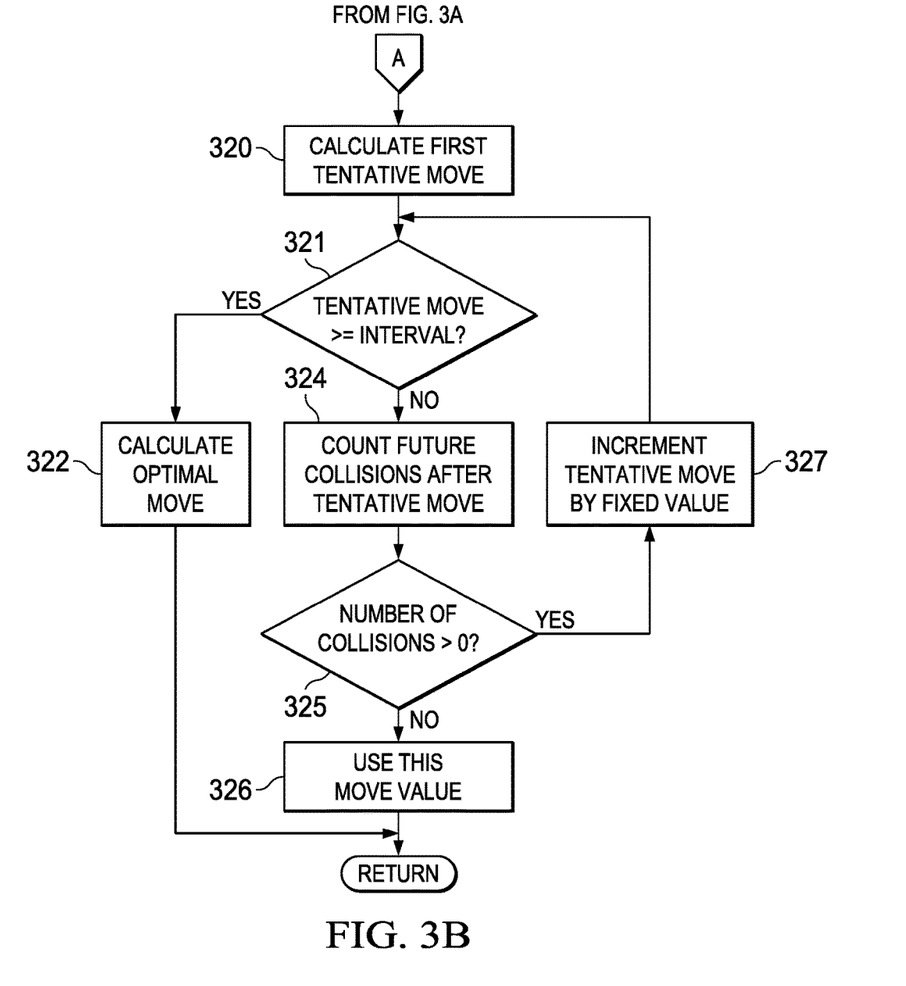

FIGS. 3A-3B are flow charts illustrating a method for avoidance of connection loss by a Bluetooth device serving two piconets, which will now be disclosed in more detail. In general, this may be done by first determining that one or more of the periodic time slots of a first piconet to which the device (such as device E in FIG. 1) is connected (such as piconet 101 of FIG. 1) has or soon will collide with one or more of the periodic time slots of a second piconet (such as piconet 102 of FIG. 1) by processing time stamps for events on the first network and on the second network. Then, either the periodic time slots in the first piconet or the periodic time slots on the second piconet may be shifted by a time shift amount to avoid a collision between the periodic time slots on the first piconet and the periodic time slots on the second piconet.

In this example, it is assumed the process is performed as a software routine that is executed by a processor within the Bluetooth device. The routine may be called periodically by a management process, for example. The building block of the 'count collision' feature is to detect whether a collision takes place between two events (one event per connection). Without loss of generality and in order to simplify the explanation and the code, one connection will be referred to herein as 'long' (signifying a longer interval) and the other 'short' (signifying a shorter interval), and assume the 'long' connection's event is set 'constantly' in time and moves are performed to the short interval. In this case, a check is performed to determine which timestamps of the 'short' connection's event may cause a collision and which will not. Of course, in another embodiment the short interval may be treated as fixed and the long interval moved. In yet another embodiment, the choice of movement may be random or otherwise selected.

Figure 4A:
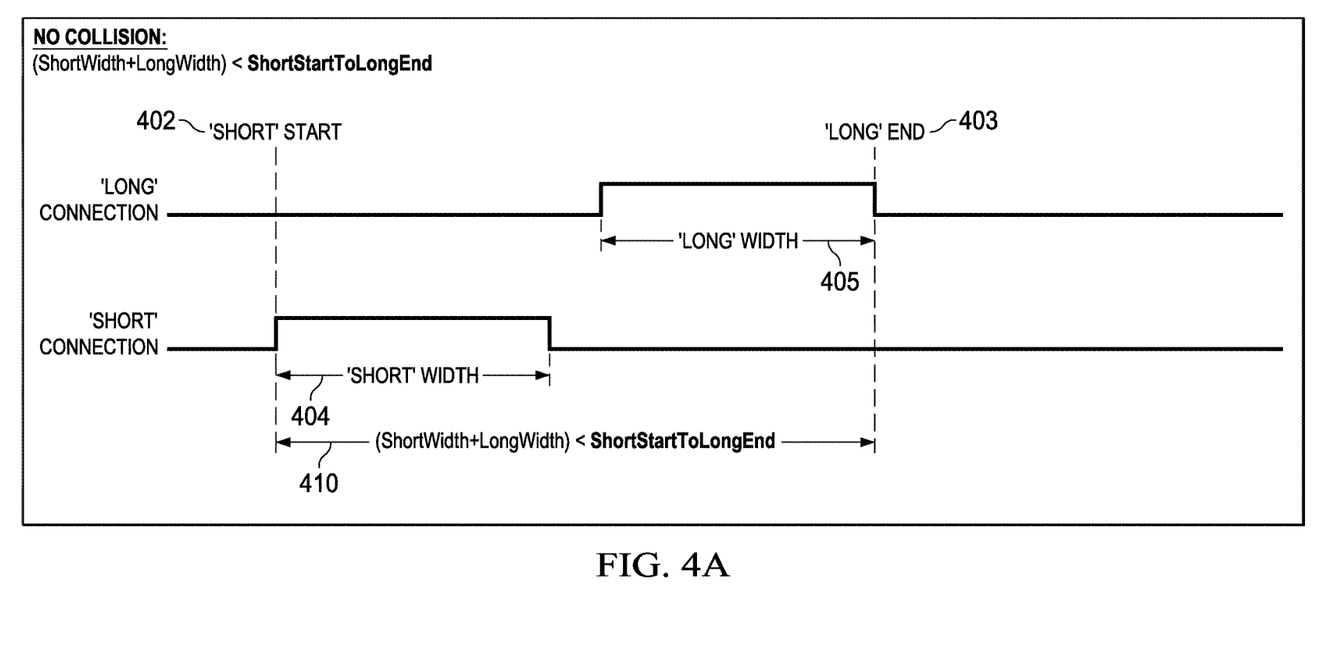
FIGS. 4A-4C are timing diagrams illustrating collisions and non-collisions between events on two piconets.
Figure 4B:
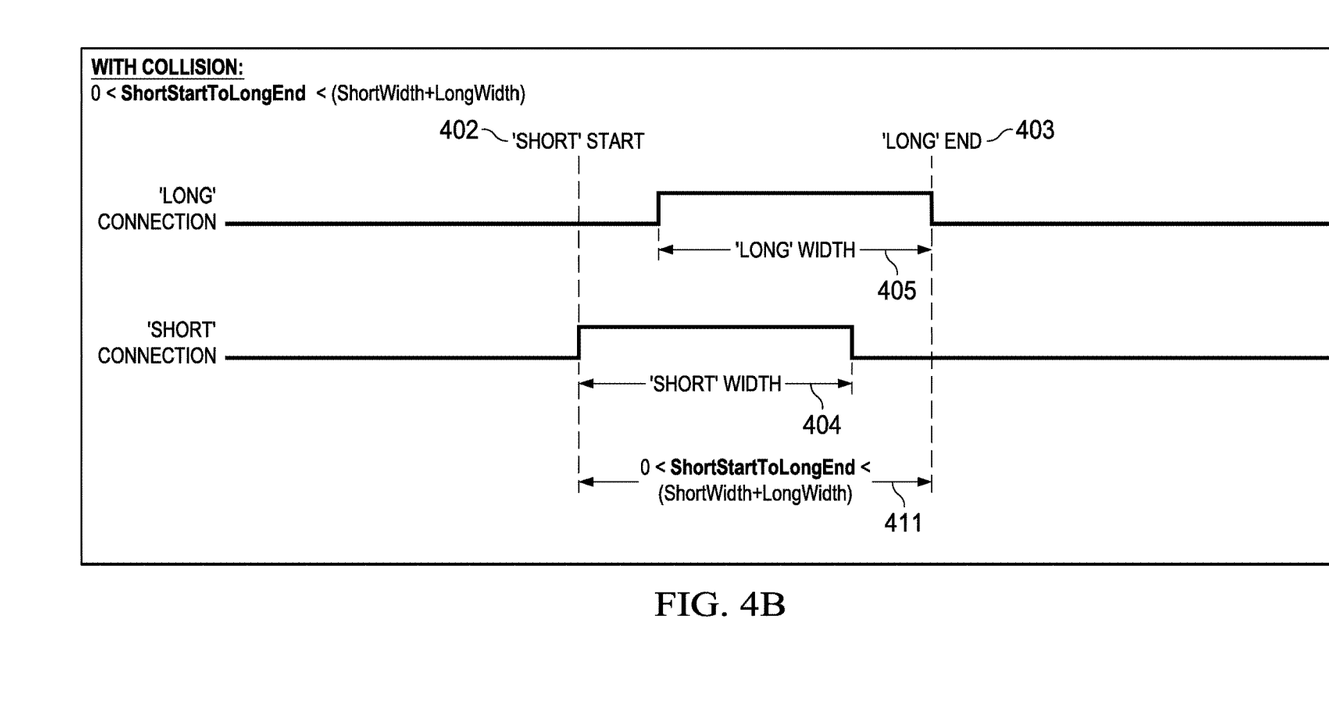
Figure 4C:
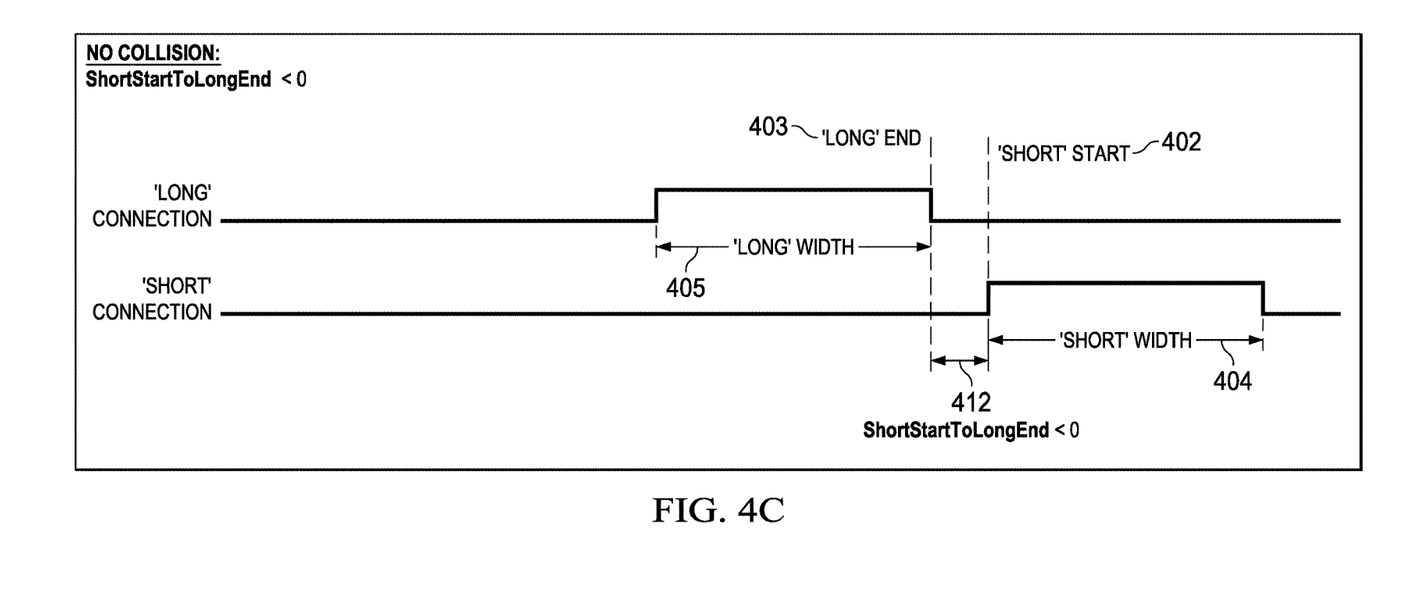

The first stage after starting the process is to calculate 302 the time elapsed from the short event start to the long event end. This variable will be compared with 0 and with the summation of the short's width 404 (active period of the event) and the long's width 405, to identify collision events. This notion is depicted in FIGS. 4A-4C. FIG. 4A illustrates no collision when the sum of short width 404 and long width 405 is less than the time 410 from the short start 402 to the long end 403. Likewise, FIG. 4C illustrates no collision when time 412 between the short start 402 and long end 403 is less than zero. A collision is illustrated in FIG. 4B; the sum of short width 404 and long width 405 is greater than the time 411 from the short start 402 to the long end 403.

A check 303 of a "no-move" counter may be made to provide a minimum interval between time shifts. The value of the no-move counter may be selected by a higher level control manager, or set to a default value for a particular device, for example. If the counter has not yet been decremented to 0, then it can be decremented 304 and a move value of "0" is returned.

The basic collision detection performed in step 302 describes how event timestamps from two specific events, one in each connection, may be compared to identify whether a collision has occurred. In order to predict the number of collisions that may occur in the near future, several such event timestamp pairs need to be calculated and checked for collisions. In this embodiment, 100 pairs are checked in module 305; however, in other embodiments a greater or a lesser number of pairs may be evaluated.

In order to calculate the future timestamps, the clock drift between the two piconets' time-bases may be learned by processing packet arrival time-stamps using a software or firmware based phase locked loop (PLL), for example. An example PLL will be described in more detail below.

The time of future collision events may then be predicted 305 by calculating timestamps of future events of both connections based on the drift rate determined for both piconets, and checking if and when these events overlap, as illustrated by FIGS. 4A-4C.

If no collision is predicted 305 in the near future, then a move value of "0" may be returned 307 to the manager function.

If a collision is predicted in the near future, or a current collision is detected, an optimal time shift required in order to avoid the coming collisions may be determined 308. In general, it is desirable to find a time shift amount that minimizes the number of collisions in the near future. One way to do this is described in more detail in FIG. 3B. Another way to do this is to create a table and calculate the ShortStartToLongEnd 411, referring again to FIG. 4B, for a set of relevant events in the near future, such as the next 100 events. The table may then be sorted and all table entries with values between 0 and 'LongWidth+ShortWidth' represent collisions. Counting the number of such entries would provide the number of collisions in the near future. A tentative move of the 'long' connection to the 'right' can be 'implemented' by adding the 'move' value to all table entries. A tentative move of the 'short' connection to the 'right' can be 'implemented' by subtracting the 'move' value from all table entries. Furthermore, the minimal 'move' value required in order to solve all current collisions may be calculated from the table by using the using the maximal or minimal table entries within the (0, LongWidth+ShortWidth) range specified above to calculate the move, depending on which connection is moved. Note that this minimal move might cause 'new' collisions to form. The number of such 'new' collisions may be calculated from the sorted table easily by checking how many entries fall in the 'collision range' after the subtraction/addition to the table.

FIG. 3B illustrates another scheme to determine an optimal time shift. In this scheme, several 'tentative' time shifts may be generated 320 and then given to a 'predict collisions' module 324 to count the number of collisions that would take place should these tentative moves be applied. Module 324 may operate in the same manner as module 305, which was described above in more detail.

If the moveable connection is the short connection, ShortStartToLongEnd 411 may be used to determine an initial move value, referring again to FIG. 4B. If the moveable connection is the long connection, LongWidth 405−(ShortStartToLongEnd 411−ShortWidth 404) may be used to calculate the initial move value, referring again to FIG. 4B.

After each tentative move value is evaluated, the move value may be incremented 327 by a fixed value. This fixed value may be calculated by dividing the short interval by the number of iterations to be performed. The number of iterations may be increased to improve resolution or decreased to reduce computing load, for example. As long as the tentative move time does not exceed 321 the short interval time, the process continues to module 324. During the tentative move value iteration process, if zero collisions are predicted 325 for a given move value, then that move value may be used 326 as the optimum value.

Once the tentative move value exceeds 321 the short interval period, an optimal move value may be selected 322. The tentative move that is predicted to have the minimal number of collisions may then be selected for use.

Another scheme to determine an amount to move is to add a minimal value that solves the first coming collision, and then check it for collisions, repeating the same calculation iteratively until a move is found with zero collisions or until an overflow to the next interval occurs. Thus, various schemes may be used for selecting a move amount that may minimize or eliminate collisions in the near future.

Regardless of how a move amount is selected, a connection update may then be requested 310 on either the short interval or the long interval piconet. For example, the calculation may deliver an optimal move assuming the short connection is moved, and then the control layer above may translate this value into the optimal move required from the long connection if the long is selected to be the moveable one. If the device serving the two networks is a master, then it may perform the connection update. If the device is a slave, then it passes the request on to the master of the network.

Figure 5:
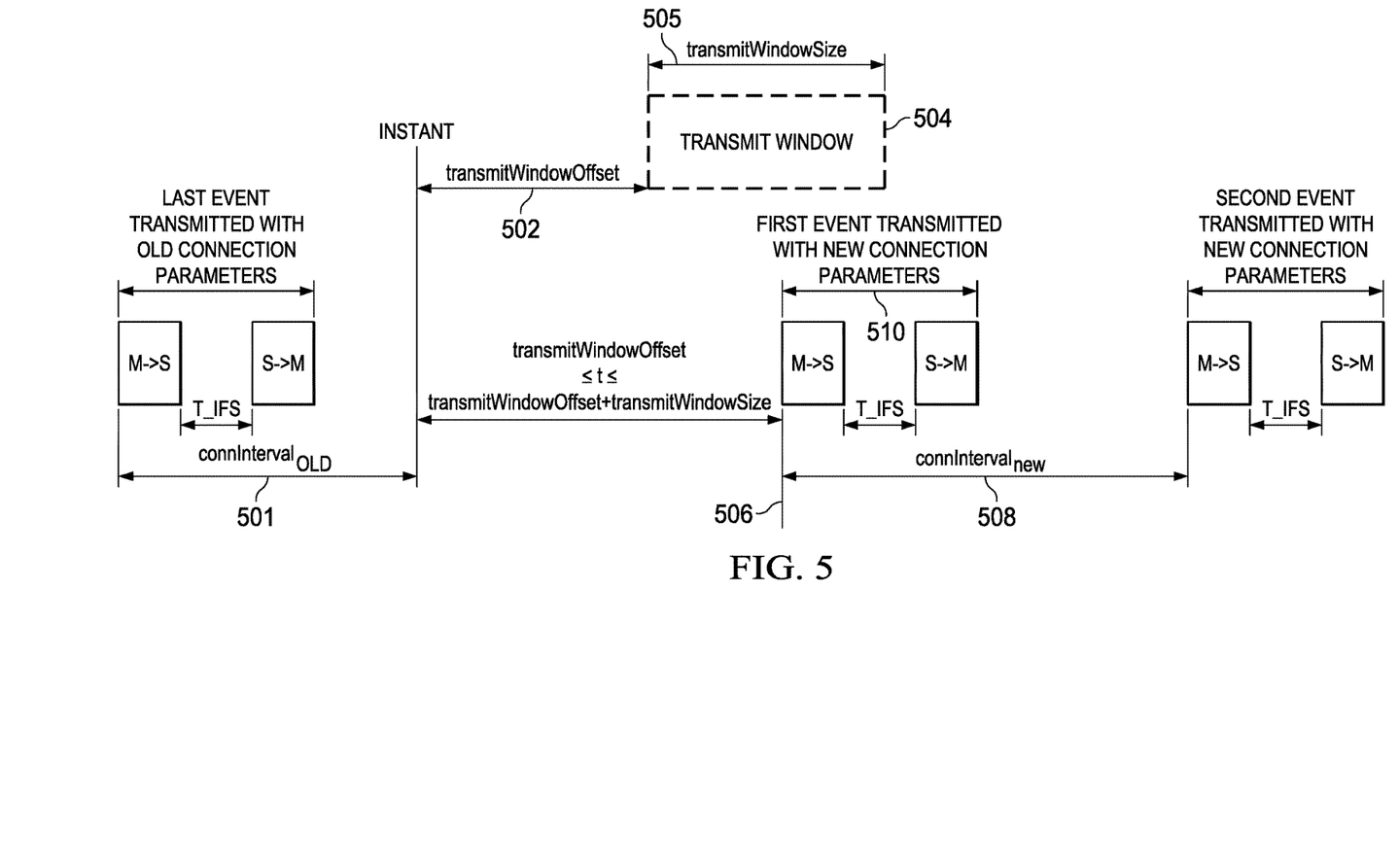
FIG. 5 is a timing diagram illustrating updating of connection event timing.

FIG. 5 is a timing diagram illustrating updating 311, referring again to FIG. 3, of connection event timing. Bluetooth Specification Version 4.1, Volume 6, part B, section 5.1.1, which is incorporated by reference herein, describes a procedure for connection updates. This Bluetooth 'connection parameter update' feature may then be used by setting the 'transmitWindowOffset' parameter to apply the calculated optimum move value to shift the slots in the piconet that has the short interval time so that coming collisions are avoided.

As defined by section 5.1.1, the master may adjust the anchor point when deciding the timing of the first packet transmitted with new connection parameters. A transmit window 504 is used, as defined in Section 4.5.3 of the Bluetooth Specification. The transmit window 504 starts at connIntervalOLD 501+transmitWindowOffset 502 after the anchor point of the connection event before the instant. The transmitWindowOffset shall be a multiple of 1.25 ms in the range of 0 ms to connIntervalNEW 508. The transmitWindowSize 505 shall be a multiple of 1.25 ms in the range of 1.25 ms to the lesser of 10 ms and (connIntervalNEW−1.25 ms).

The master shall start to send the first packet within the transmit window as defined in Section 4.5.3 of the Bluetooth Specification. It is permitted that the master's first packet can extend beyond the transmit window. The first packet 510 sent after the instant by the master determines the new anchor point 506 for the connection events, and therefore the timings of all future connection events in this connection. For this reason it is preferable to be the master of the connection that is being time shifted. In cases where the device is a slave on both networks, there is some risk that the actual time shift implemented by the master in response to the connection parameter update request will not provide an optimal time shift. However, testing has demonstrated that this is generally not a problem.

Figure 6:
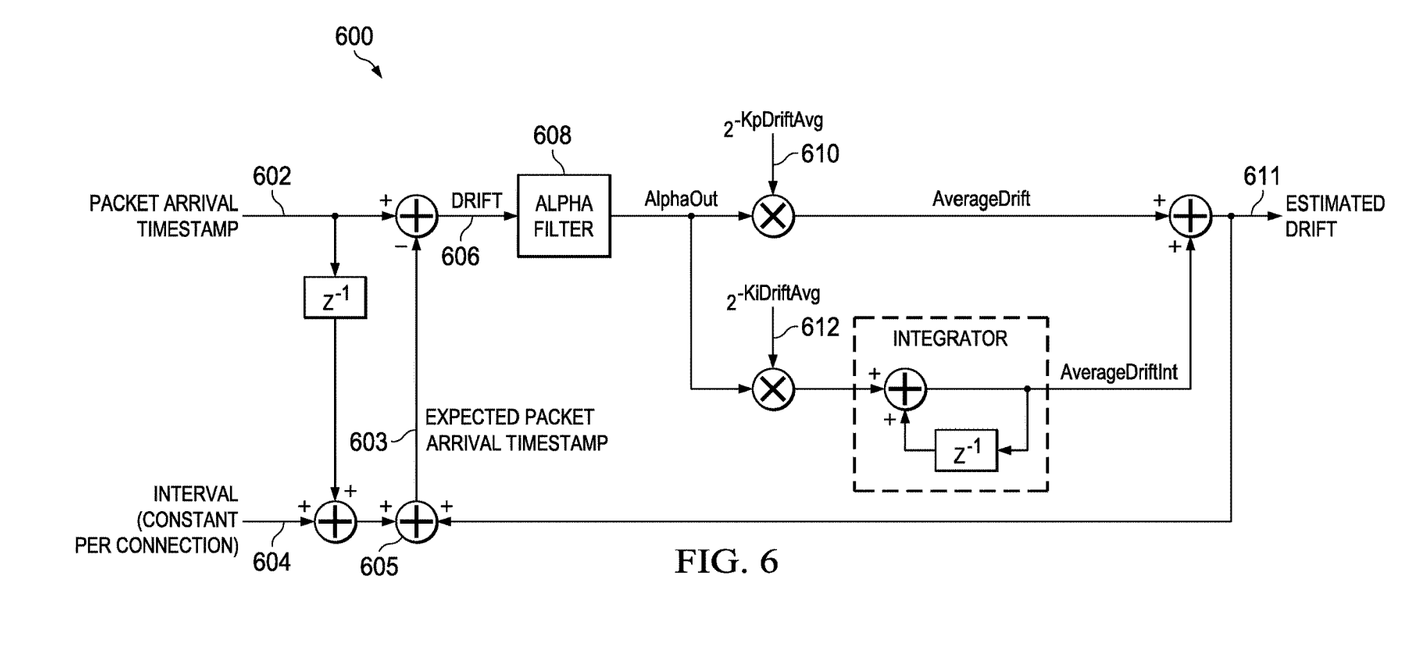
FIG. 6 is a block diagram illustrating an exemplary phase locked loop.

FIG. 6 is a block diagram illustrating phase locked loop 600 that may be used to process the timestamps generated by the detection of each periodic time slot received by the device on a given piconet. PLL 300 may be implemented in software or firmware that may be executed by a processor on the device, for example. A separate PLL may be implemented for each connection on which the device is a slave. Thus, if the device is a slave on two networks then it will implement two PLLs.

The PLL is a first order loop that tracks the drift, i.e. the effect of the PPMs on the timestamps of events in a certain connection with a certain interval. The figure depicts an algorithmic perception of the PLL. The general concept and operation of a PLL is well known and need not be described in detail herein. The implementation specifics may include more details than shown here—shifts used for full precision, fixed point operations such as 'round', 'clip' etc., different units (such as Instant and PT instead of 'time') etc. In this embodiment, the units (algorithmically) of packet arrival time, interval, and drift are time units (usec, for example). This means that a certain PPM may cause different drift values, depending on the interval used.

A packet arrival timestamp 602 may be generated by logic on the Bluetooth device each time it detects a frame that includes one of the periodic time slots that are designated for its use on a given piconet. Interval 604 is the interval time of the periodic time slots assigned to the Bluetooth device. An expected packet arrival timestamp 603 may be derived from the interval value 604 and modified by the final estimated drift 611 by adder 605. The loop is intended to minimize the value of drift 606.

Unlike most PLL loops, where the PPM may be constant and the drift is a ramp, in this case, the drift is a constant value (assuming a certain interval and constant PPMs). This is because for every iteration K the calculation of the expected timestamp uses the timestamp of the previous iteration (K−1), as the baseline for the calculation. For this reason a first order loop is sufficient, and a second order loop is not required.

An alpha filter 608 may be used to smooth the drift value 606 which is used in the PLL. An alpha filter is a well known signal processing construct and is essentially a moving average low-pass filter. In this embodiment, the drift value is heavily quantized into integer usecs, and in order to allow more flexibility in the integral gain (Ki) 612 and proportional gain (Kp) 610 configuration, it was decided to add this alpha filter. In another embodiment, a finer quantization may eliminate the need for this filter, for example. Alternatively, the 'Ki' and 'Kp' branches may include filters of their own, replacing the Alpha Filter.

Figure 7:
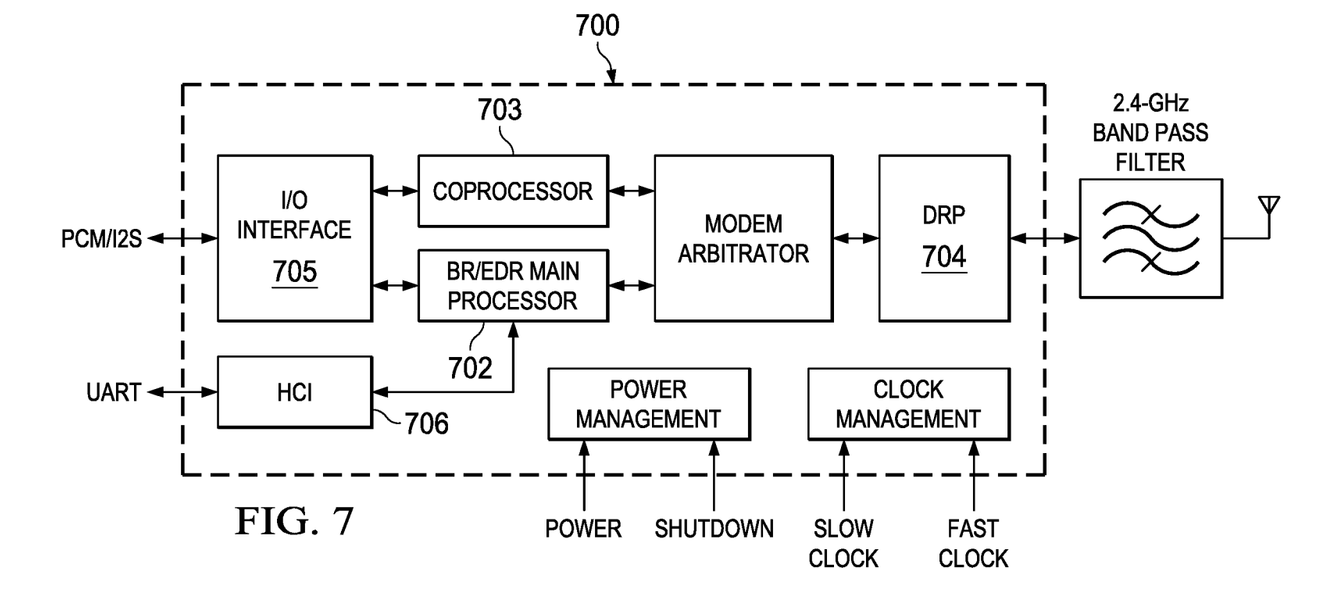
FIG. 7 is an exemplary Bluetooth device.

FIG. 7 is an exemplary Bluetooth device 700. In this example, Bluetooth device 700 is similar to a CC256x device available from Texas Instruments. A family of CC256x devices is described in detail in "CC256x Dual-Mode Bluetooth Controller", SWRS121E, July 2012, revised January 2016, which is incorporated by reference herein.

Briefly, device 700 may be implemented as a system on chip (SoC) on a single integrated circuit (IC), for example. Device 700 may include a main processor 702 that executes firmware/software stored in non-volatile memory that may be included within processor 702, for example, or coupled to processor 702 in order to perform the Bluetooth BR/EDR functionality. A coprocessor 703 may be used to assist in performing the Bluetooth LE functionality by executing firmware and/or software routines stored in non-volatile memory included within or coupled to coprocessor 703.

A digital radio processor (DRP) 704 includes an all digital PLL, a power amplifier for transmitting and a low noise amplifier for receiving wireless signals, and demodulator.

The demodulator digitally down converts a received signal to zero-IF and recovers the data stream using an adaptive-decision mechanism. The transmitter is an all-digital, sigma-delta phase-locked loop (ADPLL) based with a digitally controlled oscillator (DCO) at 2.4 GHz as the RF frequency clock. The transmitter directly modulates the digital PLL. The power amplifier is also digitally controlled. The transmitter uses the polar-modulation technique. While the phase-modulated control word is fed to the ADPLL, the amplitude-modulated controlled word is fed to the class-E amplifier to generate a Bluetooth standard-compliant RF signal.

Device 700 may incorporate a UART module 706 dedicated to the known HCI (Host Controller Interface) transport layer. The HCI interface transports commands, events, and ACL between the device and the host using HCI data packets.

Codec interface 705 is a fully programmable port to support seamless interfacing with different PCM (pulse code modulated) and I2S (inter-IC sound) codec devices.

As described in more detail above, firmware and/or software modules that are stored in memory coupled to processor 702 and/or processor 703 may be executed by processor 702 and/or coprocessor 703 to detect and predict event collisions between events on two different piconets being served by device 700 and to determine an amount to shift one or the other periodic time slots used by device 700 on the two different piconets in order to prevent or minimize future collisions.

Thus, embodiments of this disclosure may improve the operation of a multi role BT/BLE device. As described above, all 'connection periods' may be supported without connection loss. Air efficiency throughput may be improved without the need for additional buffering.

Other Embodiments

While the invention has been described with reference to illustrative embodiments, this description is not intended to be construed in a limiting sense. Various other embodiments of the invention will be apparent to persons skilled in the art upon reference to this description. For example, embodiments of the disclosure may be applied to Bluetooth BR devices, Bluetooth LE device, dual mode Bluetooth devices, etc. Thus, when the term "Bluetooth device" is used herein, it is intended to refer to any type of Bluetooth device that uses periodic slot based communication.

Embodiments of this disclosure may be implemented in all manner of Bluetooth devices, such as simple sensors, headphones, ear pieces, cameras, cellular telephones, tablets, laptop computers, etc.

In some embodiments, a device may wait until a collision occurs before initiating a time shift procedure as described herein.

In some embodiments, only one, or only a few tentative time shift amounts may be evaluated before performing a time shift.

While a system in which a Bluetooth device serves two piconets, was described herein, other network topologies may be implemented in which a Bluetooth device serves more than two piconets. In this case, the Bluetooth device may be configured to track timing drift on each of the networks that it serves and request timing shifts as needed to avoid/reduce collision.

Detection of collisions may be done by comparing time stamps, as described above, or by other methods. For example, a device serving two piconets may have two 'schedulers'—one for each connection. Each scheduler is in charge of initiating the 'event' activities at the correct time-stamp for its respective connection. These activities, for example, might be turning on the reception chain, receiving a packet, turning off the reception chain, turning on the transmission chain, transmitting a reply, and finally turning off the transmission chain and returning to idle. A collision is a situation in which the other connection's scheduler tries to initiate activities before the current activities are over. This may be detected by an interrupt handler rather than by directly comparing timestamps, for example.

While a method of using a PLL to determine drift of the interval time was described herein, in other embodiments a different method may be used determine a future event time. For example, after detecting a collision the duration during which event windows on each connection overlap may be measured. This would be similar to calculating LongStart-toShortEnd in FIG. 4B. The long connection could then be moved by this amount plus a small margin. In this manner, a PLL may not be needed.

While operation on Bluetooth piconets was disclosed herein, an embodiment of the present disclosure may be applied to other types of network protocols that use event based transmission windows in which timing of the events on the multiple networks may drift over time and result in collisions or other types of inter-network interference.

Furthermore, while wireless operation was discussed herein, other embodiments may include wired network protocols that use event based transmission windows in which timing of the events on the multiple networks may drift over time and result in collisions or other types of inter-network interference.

The techniques described in this disclosure may be implemented in hardware, software, firmware, or any combination thereof. If implemented in hardware, various configurations of control logic may be implemented to perform the methods disclosed herein. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a device on multiple networks, the method comprising:
    establishing a connection on a first network, in which the device is assigned first periodic time slots for performing transactions on the first network, in which a first interval time is specified as a time between each one of the first periodic time slots based on a first reference clock;
    establishing a connection on a second network, in which the device is assigned second periodic time slots for performing transactions on the second network, in which a second interval time is specified as a time between each one of the second periodic time slots based on a second reference clock, in which the first reference clock and the second reference clock have a relative drift rate;
    determining that one of the first periodic time slots has or soon will collide with one of the second periodic time slots by processing time stamps for events on the first network and on the second network;
    selecting a time shift from a plurality of tentative time shifts, in which each tentative time shift is calculated by predicting a number of collisions that would result from a different time shift over a period of time, and in which the selected time shift is predicted to produce a minimum number of collisions over the period of time; and
    requesting a shift of either the first periodic time slots or the second periodic time slots by the selected time shift to avoid a collision between the first periodic time slots and the second periodic time slots.

2. The method of claim 1, in which the device is a Bluetooth device, and in which the first network and the second network are piconets.

3. The method of claim 2, in which requesting shifting of the first periodic time slots or the second periodic time slots is performed by transmitting a Bluetooth connection parameter update packet.

4. The method of claim 1, further including determining a drift rate for the first interval time based on the time stamps for events on the first network.

5. The method of claim 4, further including predicting actual times of future time slots on the first network using the first interval time and the determined drift rate.

6. A device for operating on multiple networks, comprising:
    a transmitter and receiver configured for coupling to the multiple networks;
    processing logic coupled to the transmitter and receiver, in which the processing logic is operable to decode signals received by the receiver, in which the device is assigned first periodic time slots for performing transactions on a first network, in which a first interval time is specified as a time between each one of the first periodic time slots based on a first reference clock, and in which the device is assigned second periodic time slots for performing transactions on a second network, in which a second interval time is specified as a time between each one of the second periodic time slots based on a second reference clock, in which the first reference clock and the second reference clock have a relative drift rate; and
    in which the processing logic is configured to determine that one of the first periodic time slots has or soon will collide with one of the second periodic time slots by processing time stamps for events received by the receiver on the first network and on the second network, and to select a time shift from a plurality of tentative time shifts, in which each tentative time shift is calculated by predicting a number of collisions that would result from a different time shift over a period of time, and in which the selected time shift is predicted to produce a minimum number of collisions over the period of time, the processing logic being further configured to request a shift of either the first periodic time slots or the second periodic time slots by the selected time shift to avoid a collision between the first periodic time slots and the second periodic time slots.

7. The device of claim 6, in which the processing logic is further configured to determine a drift rate for the first interval time based on the time stamps for events received by the receiver on the first network.

8. The device of claim 7, further including predicting actual times of future time slots on the first network using the first interval time and the determined drift rate.

9. The device of claim 6, in which the device is a Bluetooth device, and in which the first network and the second network are piconets.

10. The device of claim 9, in which the processing logic requests a shift of the first periodic time slots or the second periodic time slots by configuring the transmitter to transmit a Bluetooth connection parameter update packet.

11. A non-transitory computer readable medium storing software instructions that, when executed periodically by a processor of device that is serving two Bluetooth piconets, cause a method for avoiding slot collisions to be performed, the method comprising:
    determining that one or more periodic time slots assigned to the device on a first piconet has or soon will collide with one or more periodic time slots assigned to the device on a second piconet by processing time stamps for events on the first piconet and on the second piconet;
    selecting a time shift from a plurality of tentative time shifts, in which each tentative time shift is calculated by predicting a number of collisions that would result from a different time shift over a period of time, and in which the selected time shift is predicted to produce a minimum number of collisions over the period of time; and
    requesting a shift of the periodic time slots on either the first piconet or on the second piconet by the selected time shift to avoid a collision between the periodic time slots on the first piconet and the periodic time slots on the second piconet.

12. The method of claim 11, further including determining a drift rate for an interval between the periodic time slots assigned to the device on the first piconet based on the time stamps for events on the first piconet.

13. The method of claim 12, further including predicting actual times of future time slots on the first network using the interval and the determined drift rate.

14. The method of claim 11, in which requesting a shift of the periodic time slots is performed by transmitting a Bluetooth connection parameter update packet.

* * * * *